K. RUSHTON.
REAR SUSPENSION FOR LOCOMOTIVES.
APPLICATION FILED FEB. 17, 1913.
1,095,929.                                       Patented May 5, 1914.
2 SHEETS—SHEET 2.
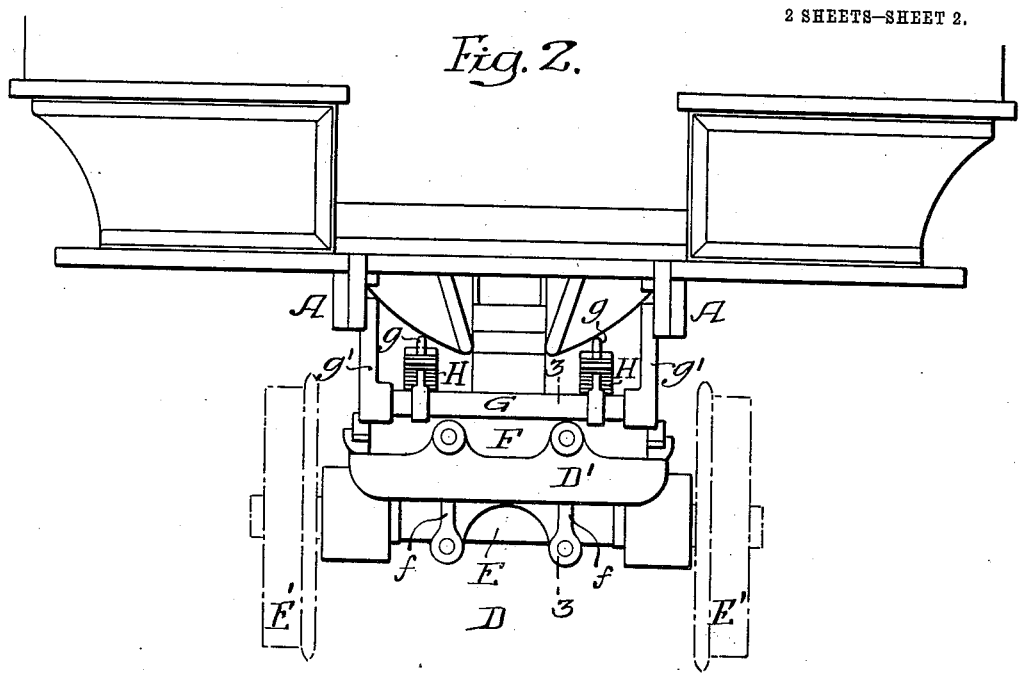
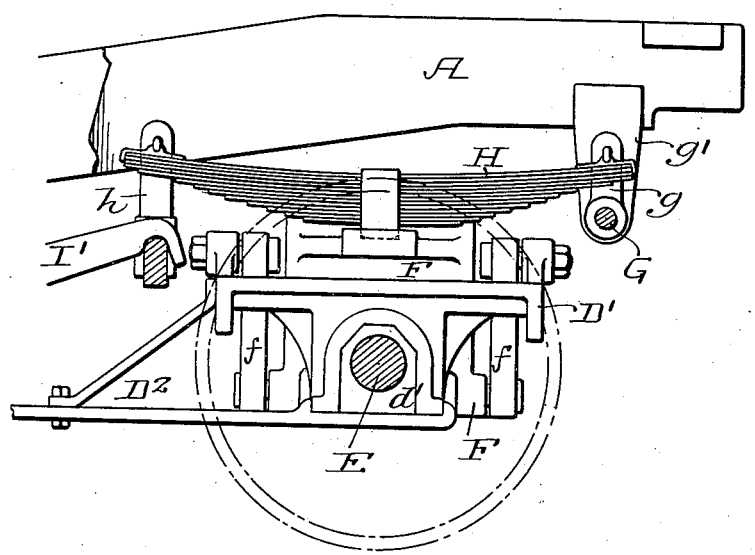
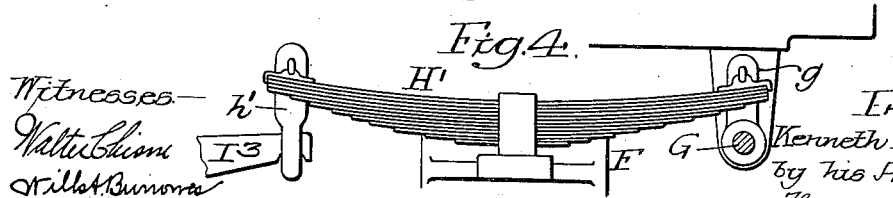

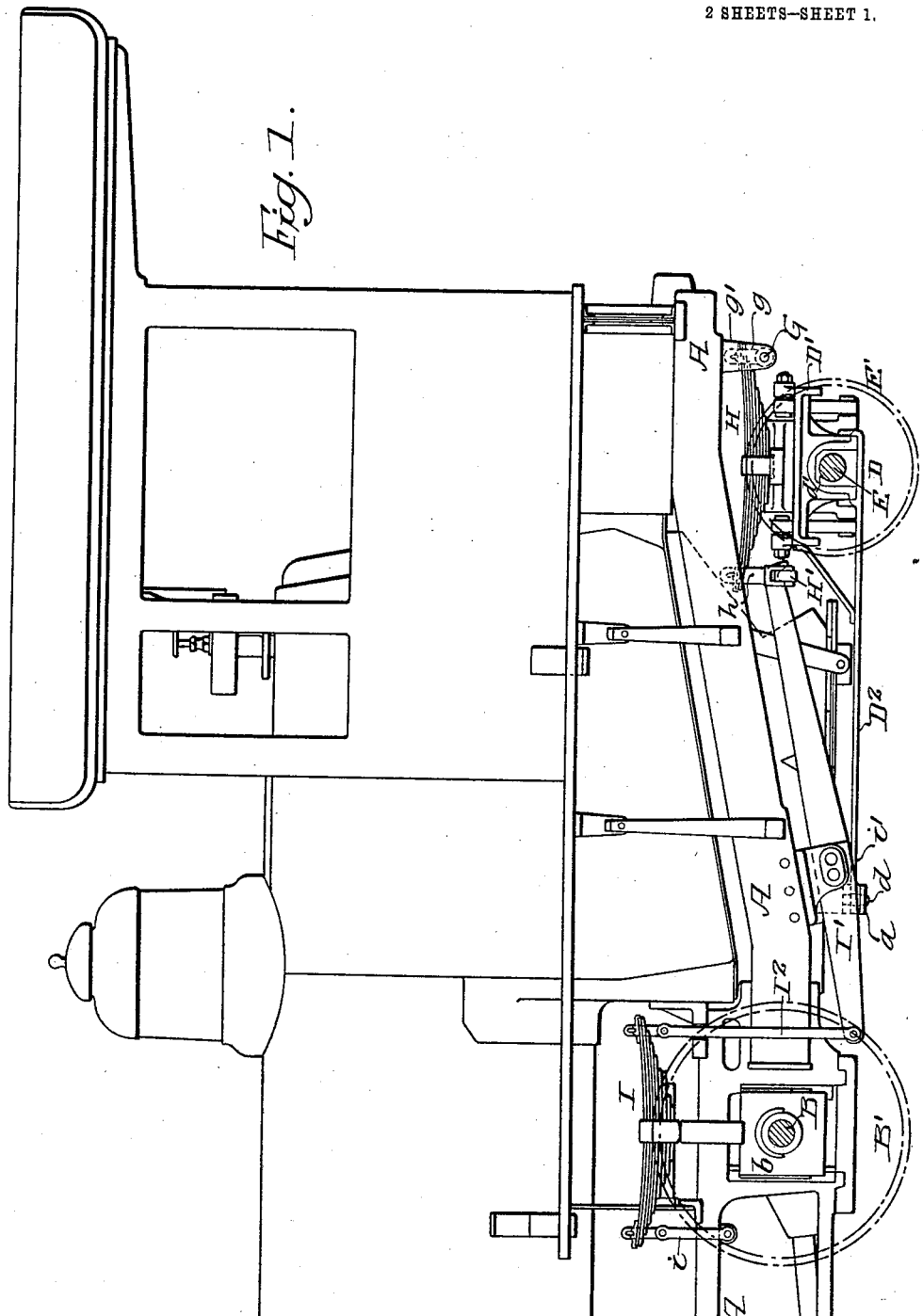

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

REAR SUSPENSION FOR LOCOMOTIVES.

1,095,929.  Specification of Letters Patent.  Patented May 5, 1914.

Application filed February 17, 1913. Serial No. 748,921.

*To all whom it may concern:*

Be it known that I, KENNETH RUSHTON, a citizen of the United States, residing in Philadelphia, Pennsylvania, have invented certain Improvements in Rear Suspension for Locomotives, of which the following is a specification.

My invention relates to certain improvements in locomotives of the type in which a trailing swing truck is used at the rear of the driving wheels; the same being located under the rear portion of the locomotive.

The object of my invention is to provide means for properly supporting the rear of the locomotive on the swing truck, through the medium of the equalizing gear at each side of the locomotive, without affecting the lateral movement of the truck. This object I attain in the following manner, reference being had to the accompanying drawings, in which:—

Figure 1, is a side view, partly in section, of sufficient of a locomotive to illustrate my invention; Fig. 2, is an end view of the rear portion of the frame; Fig. 3, is a side view of the trailer truck with the frame broken away; and Fig. 4, is a view of a modification.

Referring to the drawings, A, A are the side frames of the locomotive, which extend substantially the full length of the same.

B is one of the driving axles having wheels B', as shown by dotted lines.

$b$ is one of the boxes for the driving wheels.

D is a trailer truck having an axle E on which are the wheels E'. This trailer truck has a bolster F connected to the main frame D' by links $f$. The main frame has a forward extension $D^2$, which is pivoted at $d$ to the cross bar $a$ connected to the two side frames A. In the main frame D' of the truck are the boxes $d'$ for the axle E.

In the present instance the equalizing gear is arranged as follows: At each side of the locomotive is a spring I which rests upon the box $b$ of the rear driving axle and is coupled, by a link $i$, to the frame A. $I^2$ is a link connecting the springs I with one arm of the lever I' pivoted to the frame at $i'$. The other arm of each lever I' engages a transverse bar H' which is suspended by links $h$ from springs H which, in turn, rest upon spring seats on the bolster F. The other end of each spring H is connected by a link $g$ to a cross bar G mounted in brackets $g'$ on the under side of each side frame A, so that the equalizing gear on each side of the locomotive extends to the rear end of the side frame and, as the spring rests on the bolster of the rear swing truck, the overhanging portion of the frame is properly supported.

In Fig. 4, I have shown the equalizing lever $I^3$ attached directly to a link $h'$ suspended from the spring H, dispensing with the transverse bar. It will be seen that while the truck is free to swing on its pivot $d$, the bolster F supports the spring H on each side of the locomotive; the rear of the locomotive being directly carried by the swing truck through the equalizing gear, which makes a very substantial support for the rear structure of the locomotive.

It will be understood that while I have shown one type of equalizing gear, other types may be used without departing from the essential features of the invention.

Heretofore, in locomotives having a rear swing truck consisting of a frame; a bolster and links connecting the two; the equalizing gear only extended to the rear truck and, consequently, the load was carried some distance from the rear of the locomotive frame. There was considerable overhang and the frame had to be designed so as to carry this overhang. By my invention, however, the frame can be made lighter than heretofore, yet the load will be properly supported.

I claim:—

1. The combination in a locomotive having a rear swing truck, of the two side frames of the locomotive; driving axles; a rear swing truck extending under the rear of the locomotive and consisting of a main frame and a bolster; links connecting the two so as to allow the bolster to swing laterally; boxes on the main frame; an axle mounted in the boxes; with an equalizing gear bearing upon the main frame of the truck and attached to the locomotive frame at the rear of said truck.

2. The combination in a locomotive, of a main frame; driving axles; said main frame extending rearwardly beyond the driving axles; a rear swing truck pivoted to the frame and located under the rear portion of the locomotive; a single axle, having wheels, supporting said truck; a bolster hung from the said truck; an equalizing gear extending over the boxes of the driving axles and having a spring member resting on the bolster of the rear swing truck; and a link connecting said spring member to the frame of the locomotive at the rear of the swing truck.

3. The combination in a locomotive, of the driving axles; boxes therefor; a main frame extending to the rear of the driving axles; a swing truck mounted under the rear of the locomotive frame and having a forward pivot connected to the frame; a bolster mounted on the rear truck; an equalizing gear at each side of the locomotive and having a lever located between the rear driving axle and the swing truck; a spring resting on the bolster of the rear truck; a link connecting the spring to one arm of the lever; and a link connecting the spring to the frame at a point back of the truck.

4. The combination in a locomotive, of a main frame; a driving axle; boxes therefor; a swing truck mounted under the rear of the locomotive frame and having a forward pivot connected to the frame; a bolster on the rear truck; links connecting the bolster to the main body portion of the swing truck, so that the truck can swing laterally independently of the bolster, spring seats on the bolster; longitudinally arranged springs resting on the seats; links connecting the rear end of each spring to the rear end of the frame of the locomotive; and equalizing levers pivoted to the main frame and connected to the forward ends of each spring.

5. The combination in a locomotive, of side frames; a rear driving axle; a rear swing truck pivoted to the frame back of the driving axle; with an equalizing gear at each side of the locomotive, each gear consisting of an equalizing lever pivoted to the frame; a spring resting on the box of the rear driving axle, one end of the spring connected by a link to the frame; a rod connecting the other end to one arm of the equalizing lever; a spring resting on the bolster of the rear swing truck; a link connecting the forward end of the spring to the lever; and a link connecting the rear end of the spring to the frame of the locomotive.

6. The combination in a locomotive, of a main frame; a swing truck extending under the rear of the locomotive; a bolster connected to the body of the truck by links and having spring seats; two longitudinally arranged springs mounted on the spring seats; a bar attached to the rear of the main frames of the locomotive; links connecting the rear of the springs with the said bar; a cross bar forward of the rear swing truck; and links suspending the bar from the forward ends of the springs; with equalizing levers coupled to the bars.

In testimony whereof, I have signed my name to this specification, in the presence of two subscribing witnesses.

KENNETH RUSHTON.

Witnesses:
C. E. ROBINSON,
F. B. METCALF, Jr.

Copies of this patent may be obtained for five cents each, by addressing the "Commissioner of Patents, Washington, D. C."